(12) United States Patent
Sastry

(10) Patent No.: US 12,203,435 B2
(45) Date of Patent: Jan. 21, 2025

(54) ELECTRICAL MACHINES WITH SEPARATELY INTEGRATED STARTER RING GEAR AND TRANSMISSION COUPLER

(71) Applicant: Cummins Inc., Columbus, IN (US)

(72) Inventor: Prashanth Visweswara Sastry, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/285,364

(22) PCT Filed: Apr. 13, 2021

(86) PCT No.: PCT/US2021/027010
§ 371 (c)(1),
(2) Date: Oct. 2, 2023

(87) PCT Pub. No.: WO2022/220796
PCT Pub. Date: Oct. 20, 2022

(65) Prior Publication Data
US 2024/0175418 A1     May 30, 2024

(51) Int. Cl.
*F02N 15/02*     (2006.01)
*H02K 5/10*     (2006.01)
(Continued)

(52) U.S. Cl.
CPC ............... *F02N 15/02* (2013.01); *H02K 5/10* (2013.01); *H02K 7/02* (2013.01); *H02K 7/116* (2013.01);
(Continued)

(58) Field of Classification Search
CPC ........... F02N 15/02; F02N 11/04; H02K 5/10; H02K 7/02; H02K 7/116; H02K 9/19; H02K 11/215
See application file for complete search history.

(56) References Cited

U.S. PATENT DOCUMENTS 5,341,060 A    8/1994  Kawamura
6,819,012 B1   11/2004 Gabrys
(Continued)

FOREIGN PATENT DOCUMENTS

CN    201774422 U      3/2011
DE    102008045202 A1  3/2010
(Continued)

OTHER PUBLICATIONS

International Preliminary Report on Patentability received for PCT Patent Application No. PCT/US2021/027010, mailed on Oct. 26, 2023, 7 pages.
(Continued)

*Primary Examiner* — Joseph J Dallo
(74) *Attorney, Agent, or Firm* — Faegre Drinker Biddle & Reath LLP

(57) ABSTRACT

Electric machine assemblies are disclosed. The electric machine assembly includes a stator, a rotor movably coupled with the stator, a starter ring gear component fixedly coupled with the rotor on a first side of the stator, and a transmission coupler fixedly coupled with the rotor on a second side of the stator opposite from the first side. Further disclosed are engine systems and methods of assembling the same, where the engine system includes an engine block with a crankshaft, as well as the electric machine assembly operatively coupled with the engine block such that the starter ring gear component is fixedly coupled with the crankshaft and the rotor on a first side of the stator.

17 Claims, 17 Drawing Sheets

(51) Int. Cl.
  *H02K 7/02* (2006.01)
  *H02K 7/116* (2006.01)
  *H02K 9/19* (2006.01)
  *H02K 11/215* (2016.01)
  *F02N 11/04* (2006.01)
(52) U.S. Cl.
  CPC ............. *H02K 9/19* (2013.01); *H02K 11/215* (2016.01); *F02N 11/04* (2013.01)

(56) References Cited

U.S. PATENT DOCUMENTS

| | | | |
|---|---|---|---|
| 8,808,124 B2 * | 8/2014 | Major | B60K 25/00 180/65.265 |
| 9,133,809 B2 | 9/2015 | Vogel | |
| 9,139,075 B2 * | 9/2015 | Glassner | B60K 6/405 |
| 9,148,037 B2 | 9/2015 | Kalev | |
| 9,362,801 B2 | 6/2016 | Veltri et al. | |
| 9,866,088 B1 * | 1/2018 | Hauser | H02K 16/02 |
| 2004/0232702 A1 | 11/2004 | He | |
| 2004/0251758 A1 | 12/2004 | Wilmore | |
| 2004/0256929 A1 | 12/2004 | Gabrys | |
| 2013/0213182 A1 | 8/2013 | Vogel et al. | |
| 2014/0197716 A1 * | 7/2014 | Shiina | H02K 16/02 310/68 B |
| 2014/0216399 A1 * | 8/2014 | Smith | F02D 31/002 123/376 |
| 2014/0315682 A1 * | 10/2014 | Helmer | B60W 20/00 903/902 |
| 2015/0114780 A1 | 4/2015 | Frait | |
| 2016/0258409 A1 | 9/2016 | Marthaler et al. | |
| 2017/0254311 A1 | 9/2017 | Zuo et al. | |
| 2018/0162373 A1 | 6/2018 | Colavincenzo et al. | |
| 2019/0032568 A1 | 1/2019 | Martinez et al. | |
| 2019/0186592 A1 | 6/2019 | Broughton et al. | |
| 2019/0273421 A1 * | 9/2019 | Velderman | H02K 5/18 |
| 2021/0394600 A1 * | 12/2021 | Absenger | H02K 7/116 |

FOREIGN PATENT DOCUMENTS

| | | | |
|---|---|---|---|
| GB | 1376418 A | 12/1974 | |
| GB | 2265437 A | 9/1993 | |
| JP | 3803046 B2 | 8/2006 | |
| KR | 100805011 B1 | 2/2008 | |
| WO | WO-2021209723 A1 * | 10/2021 | F16H 1/46 |

OTHER PUBLICATIONS

Copy of International Search Report and Written Opinion for International patent application No. PCT/US2021/027010, filed Apr. 13, 2021, mailed Jul. 16, 2021.

Supplementary European Search Report and Written Opinion for European patent application No. 21937132.5, mailed Nov. 19, 2024.

* cited by examiner

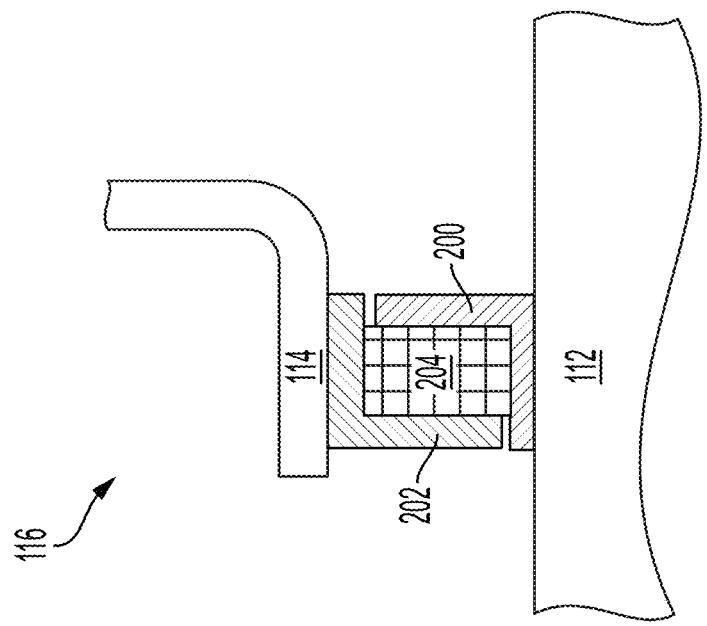
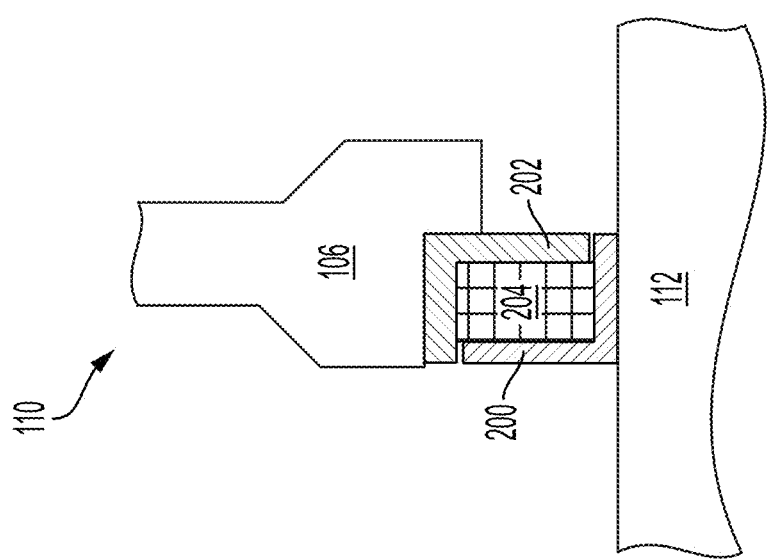

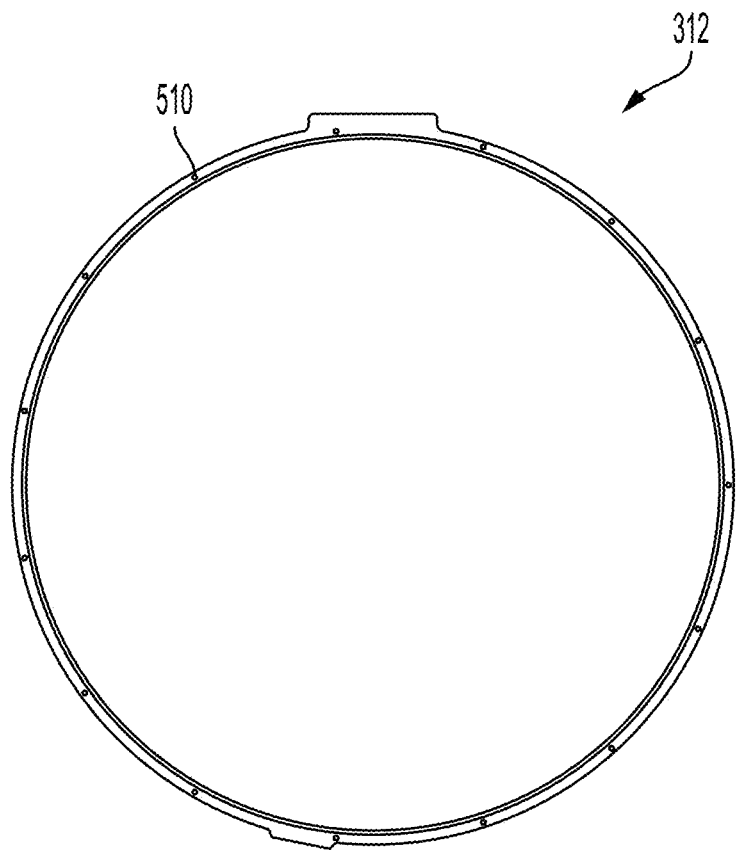
FIG. 5B
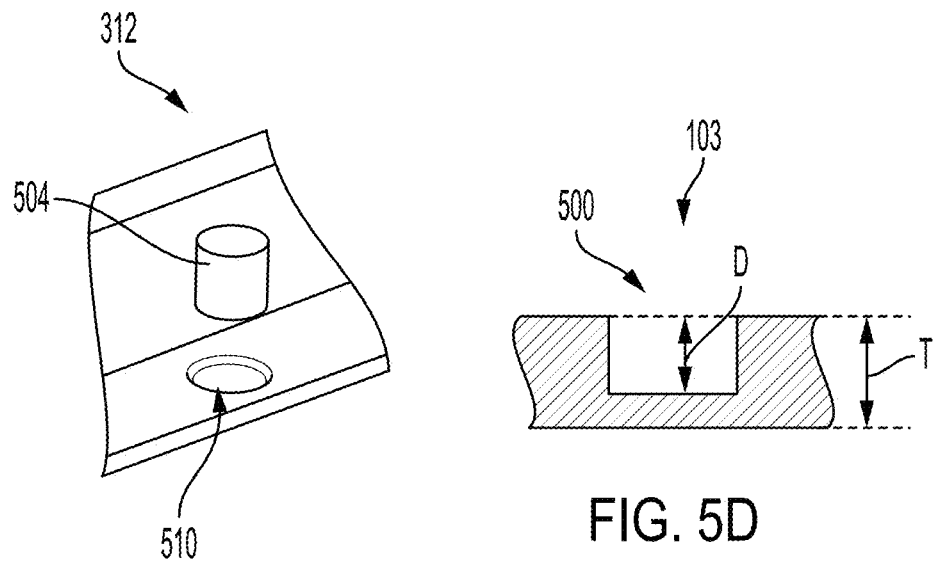
FIG. 5C
FIG. 5D

ELECTRICAL MACHINES WITH SEPARATELY INTEGRATED STARTER RING GEAR AND TRANSMISSION COUPLER

CROSS-REFERENCE TO RELATED APPLICATION

The present application claims the benefit of priority to and is a U.S. national stage of International Patent Application No. PCT/US2021/027010, filed Apr. 13, 2021, which is incorporated herein by reference in its entirety for all purposes.

FIELD OF THE DISCLOSURE

The present disclosure relates generally to electric machines and more specifically to the integration of starter motors with the electrical machines.

BACKGROUND OF THE DISCLOSURE

Electric machines such as motors and generators that have a flywheel integrated therein are intended to be integrated in engines such as internal combustion engines (ICE) and for use in electric systems where high consumption of electric energy occurs. The electric machine is designed to be built on the flywheel housing of the engine between the engine and the gearbox or transmission. A flywheel is used to conserve the angular momentum in order to efficiently store rotational energy therein, and is capable of operating as an accumulator, that is, receiving energy from and providing energy to other devices. There are two types of flywheels as known in the art: rim-type and disk-type. The rim-type flywheel allows for the mass of the flywheel to be concentrated at the rim only and reduces the weight of the flywheel, whereas the disk-type flywheel allows for the mass of the flywheel to be distributed throughout the radius. The weight distribution affects the amount of energy that can be stored in the flywheel. The rim-type flywheel is likely to burst at a much lower rotary speed than the disk-type flywheel of the same weight and diameter. As such, for higher-power applications, disk-type flywheels are more preferable.

A disk-type flywheel as known in the art has a starter ring gear attached or implemented to the periphery of the flywheel. In an engine application (e.g., ICE), the starter ring gear of the flywheel has teeth that are driven by a pinion of the starter motor of the engine such that the starter motor provides the initial rotational power to the flywheel. The flywheel provides the mechanical power for the electric machine, which uses it in turn to generate electrical power. However, because the starter motor must be implemented adjacent to the starter ring gear implemented on the outer periphery of the flywheel, the position and location of the starter motor is limited by the where the flywheel is implemented. Furthermore, the presence of the starter motor next to the flywheel also places certain limitations on the overall size of the electric machine.

Furthermore, the known implementations may cause dust from outside to accumulate within the electric machine. For example, the dust may originate from either the transmission side or the engine side, in addition to the dust that may originate from outside the vehicle. When dust accumulates in locations such as the windings and vent ducts, the dust blocks the heat and causes obstruction of ventilation which prevents the needed cooling air from reaching the windings and causing issues with the insulation system, reducing efficiency of the electric machine and potentially causing extensive downtime. The flywheel dust covers as known in the art only prevents dust outside of the vehicle from entering the system, not to prevent dust originating from inside the vehicle, such as the engine or the transmission, from entering the electric machine.

Accordingly, further contributions are needed in this area of technology to implement flexibility in the design of electric motor-implemented engines as well as to reduce the amount of dust from accumulating within the electric machine.

SUMMARY OF THE DISCLOSURE

According to the present disclosure, electric machine assemblies are disclosed. The electric machine assembly includes a stator, a rotor movably coupled with the stator, a starter ring gear component fixedly coupled with the rotor on a first side of the stator, and a transmission coupler fixedly coupled with the rotor on a second side of the stator opposite from the first side. In some embodiments, the electric machine assembly further includes a first dynamic seal disposed between the starter ring gear component and the stator on the first side of the stator and a second dynamic seal disposed between the transmission coupler and the stator on the second side of the stator. In some embodiments, each of the first dynamic seal and the second dynamic seal includes a first seal housing component attached to the rotor, a second seal housing component movably coupled with the first seal component, and a sealant disposed between the first seal housing component and the second seal housing component.

In some embodiments, the electric machine assembly further includes a sealing shield disposed between the transmission coupler and the stator such that the second dynamic seal is attached to the sealing shield. In some examples of the embodiment, the second seal housing component is attached to the sealing shield.

In some embodiments, the electric machine assembly further includes an assembly housing having a first housing component and a second housing component. The first housing component contains the starter ring gear component therein and the second housing component contains the transmission coupler therein. The second housing component is fixedly attached to the sealing shield. In some examples of the embodiment, the first housing component includes a starter enclosure portion that receives therein a starter motor to be operatively coupled with the starter ring gear component.

In some embodiments, the electric machine assembly includes a plurality of through bolts to couple the transmission coupler with the starter ring gear component. Each through bolt includes a first end fixedly coupled with the transmission coupler, a second end fixedly coupled with the starter ring gear component, and an intermediate portion therebetween extending through at least a portion of the rotor.

In some embodiments, the starter ring gear component includes a starter ring gear carrier and a starter ring gear disposed on a periphery thereof. The starter ring gear carrier has a plurality of openings that receive the plurality of through bolts. In some examples of the embodiment, the electric machine assembly further includes a Hall-effect sensor operatively coupled with the starter ring gear carrier. The starter ring gear carrier further includes a plurality of secondary openings to facilitate measuring of a voltage difference across the starter ring gear component by the Hall-effect sensor. In some of the other examples of the embodiment, the electric machine assembly further includes a Hall-effect sensor operatively coupled with the starter ring gear carrier, wherein the starter ring gear carrier further comprises a plurality of depressions to facilitate measuring of a voltage difference across the starter ring gear component by the Hall-effect sensor.

In some embodiments, the electric machine assembly includes an assembly housing containing the starter ring gear component therein, and a restriction channel at least partially defined by the starter ring gear component and the housing. The restriction channel retrains debris therewithin. In some examples of the embodiment, the electric machine assembly includes a coolant sleeve attached to the stator. The coolant sleeve includes a plurality of magnets that magnetically attract and retain ferrous debris within the restriction channel.

In some embodiments, the transmission coupler is a gearless flywheel. In some other embodiments, the transmission coupler is a flex plate. In some examples of the embodiment in which the transmission coupler is a flex plate, the electric machine assembly further includes a plurality of through bolts that couple the flex plate with the starter ring gear component. Each through bolt includes a first end fixedly coupled with the flex plate, a second end fixedly coupled with the starter ring gear component, and an intermediate portion therebetween extending through at least a portion of the rotor. The flex plate includes a plurality of nuts attached to a first side of the flex plate such that the first side of the flex plate is fixedly coupled with the rotor and a second side of the flex plate opposite from the first side receives the plurality of through bolts to fixedly couple the flex plate with the rotor.

In some embodiments, the electric machine assembly further includes an automatic transmission integration fixedly coupled with the flex plate on the second side of the flex plate. In some examples of the embodiment, the automatic transmission integration includes a flex plate adapter fixedly coupled with the second side of the flex plate via a plurality of bolts fixedly coupled with the plurality of nuts. In some examples, the automatic transmission integration further includes a transmission having a service window therein. The service window receives any tool to facilitate coupling the plurality of bolts to the plurality of nuts.

Further according to the disclosure, engine systems are also disclosed. An engine system includes an engine block with a crankshaft, as well as an electric machine assembly operatively coupled with the engine block. The electric machine assembly includes a stator, a rotor fixedly coupled with the crankshaft and movably coupled with the stator, a starter ring gear component fixedly coupled with the crankshaft and the rotor on a first side of the stator, and a transmission coupler fixedly coupled with the rotor on a second side of the stator opposite from the first side.

In some embodiments, the electric machine assembly further includes a plurality of through bolts that couple the transmission coupler with the starter ring gear component. Each through bolt includes a first end fixedly coupled with the transmission coupler, a second end fixedly coupled with the crankshaft, and an intermediate portion therebetween extending through at least a portion of the rotor. In some embodiments, the engine system further includes a starter motor operatively coupled with the starter ring gear component, and the electric machine assembly further includes an assembly housing having a starter enclosure portion to receive therein the starter motor.

Further according to the disclosure, methods of assembling an engine system are disclosed. The method includes attaching an electric machine assembly housing to an engine block; fixedly coupling a starter ring gear component with a crankshaft of the engine block, fixedly coupling a stator within the assembly housing, fixedly coupling a rotor with the starter ring gear component on a first side of the rotor and rotatably coupling the rotor with the stator, and fixedly coupling a transmission coupler with the rotor on a second side of the rotor, where the second side is opposite from the first side.

Additional features and advantages of the present disclosure will become apparent to those skilled in the art upon consideration of the following detailed description of the illustrative embodiment exemplifying the best mode of carrying out the disclosure as presently perceived.

BRIEF DESCRIPTION OF THE DRAWINGS

The detailed description of drawings particularly refers to the accompanying figures in which:

FIG. 2A is a cross-sectional diagram of a portion of a stator, a rotor, and a dynamic seal disposed therebetween according to embodiments disclosed herein;

FIG. 2B is a cross-sectional diagram of a portion of a dust shield, a rotor, and a dynamic seal disposed therebetween according to embodiments disclosed herein;

FIG. 5B shows a coolant sleeve according to embodiments disclosed herein;

FIG. 5C is an enlarged view of the coolant sleeve of FIG. 5B with a magnet to be implemented in a counterbore thereof;

FIG. 5D is a cross-sectional diagram of a portion of the ring gear component with a depression according to embodiments disclosed herein;

DETAILED DESCRIPTION

The embodiments of the disclosure described herein are not intended to be exhaustive or to limit the disclosure to the precise forms disclosed. Rather, the embodiments selected for description have been chosen to enable one skilled in the art to practice the disclosure.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error or minor adjustments made to optimize performance, for example.

With respect to terminology of "couple" such as "coupling with" or "coupling to," any suitable means and methods of coupling may be implemented. For example, when two or more components are "fixedly coupled" with each other or to another component, the means for doing so may include but are not limited to fastening, clamping, welding, affixing, screwing, etc. In some examples, such means of coupling may be temporary. When two or more components are "movably coupled" with each other or to another component, the means for doing so may include but are not limited to aligning, inserting, receiving, etc. Any suitable means as known in the art are contemplated, so long as the means for coupling does not interfere with the functionality of the individual components or the resulting product.

Figure 1A:
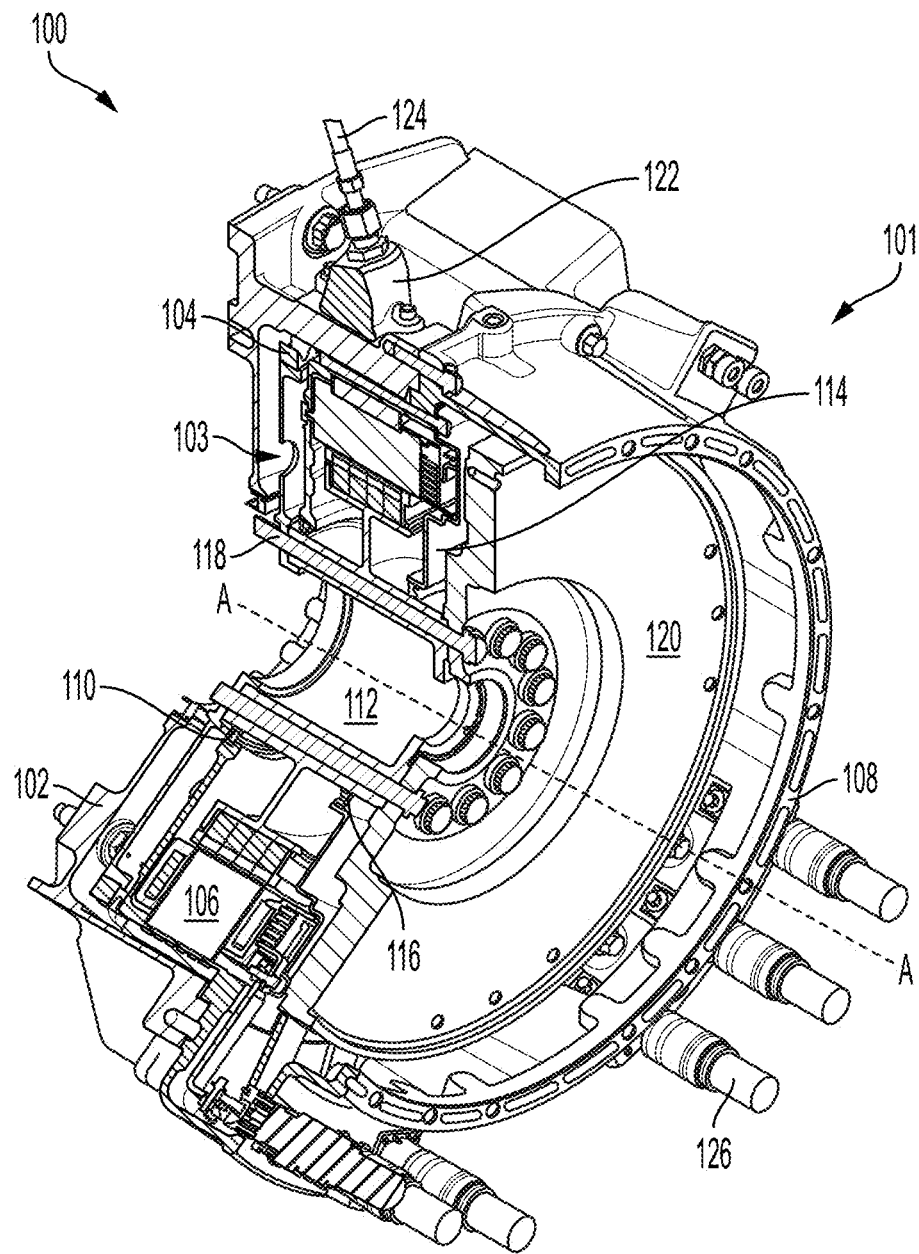
FIG. 1A is a cutaway diagram of an electric machine assembly according to embodiments disclosed herein.
Figure 1B:
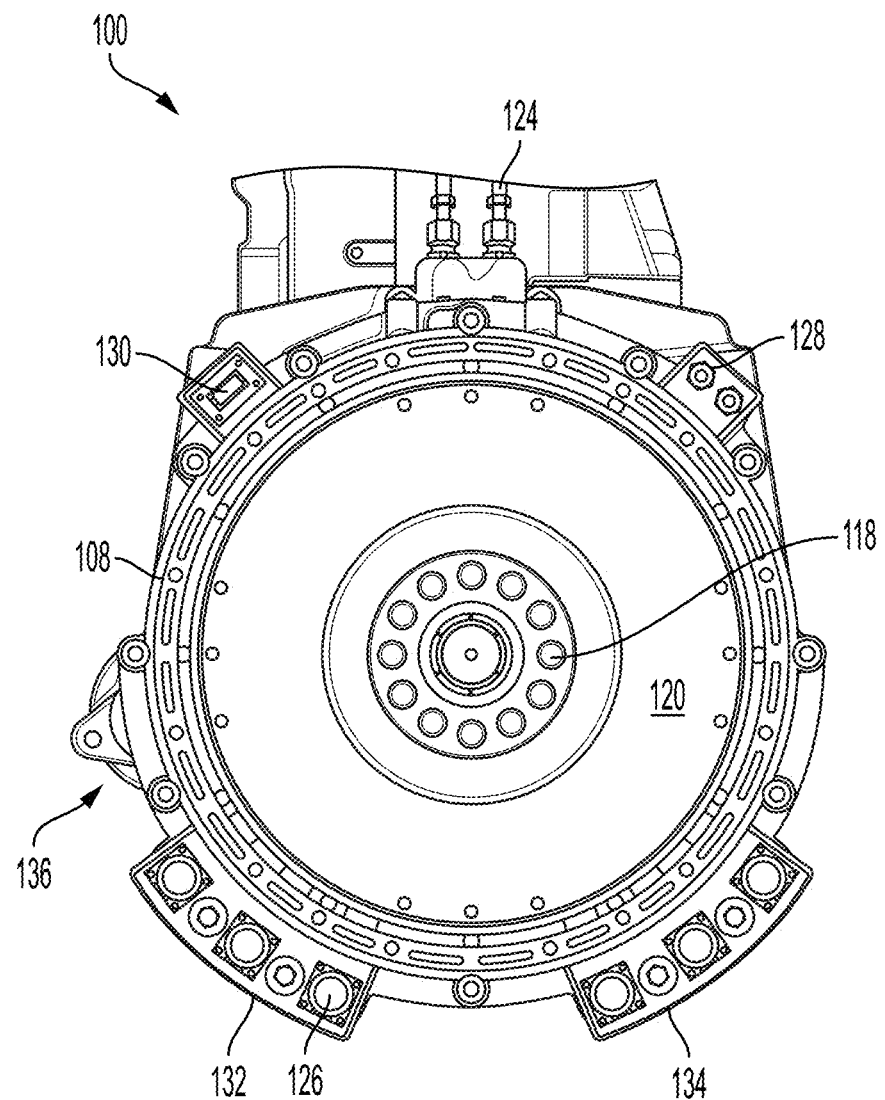
FIG. 1B is a front view of the electric machine assembly as viewed along the longitudinal axis A-A of the electric machine in FIG. 1A.
Figure 6:
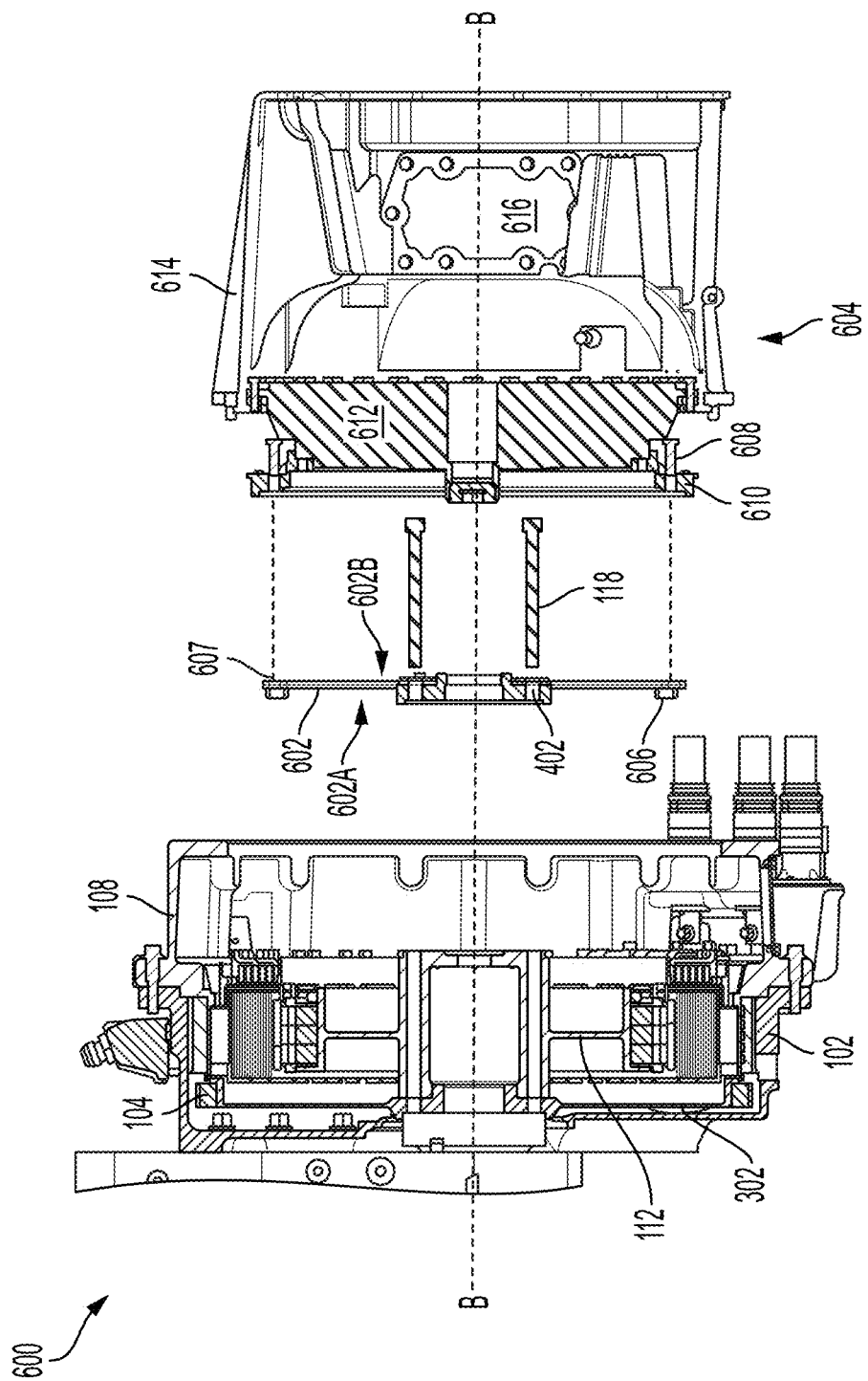
FIG. 6 is a cross-sectional diagram of an electric machine assembly with an automatic transmission integration according to embodiments disclosed herein.

FIGS. 1A and 1B show an electric machine assembly 100 as disclosed herein, with FIGS. 3A through 3G showing the different stages of assembly, as further explained, according to a method of assembling an engine system that implements the electric machine assembly. The electric machine assembly 100 may be implemented as a motor and/or generator, for example, and the electric machine assembly 100 may be implemented with an engine block and a transmission or gearbox, as further discussed, within a vehicle. The energy storage device used in the electric machine assembly 100 is a transmission coupler which operatively couples with the transmission of the vehicle to provide or receive mechanical power. In some examples, the transmission coupler may be a flywheel 120 as shown in FIGS. 1A, 1B, 3A through 3G, and FIG. 4A. In other examples, the transmission coupler may be a flex plate 602 as shown in FIG. 6.

In FIG. 1A, an assembly housing 101 contains therein a flywheel 120 that is a gearless flywheel in which there is no starter ring gear attached or implemented to the periphery of the flywheel. Therefore, the periphery or the side surface of the flywheel 120 is free of contact with any starter motor, and the disk side of the flywheel, which is the generally flat side of the flywheel 120 facing away from the electric machine, is mechanically coupled with the transmission, which may be manual transmission. Because the flywheel 120 is gearless, the outer periphery of the flywheel 120 may be smooth. For simplicity, additional components such as clutch disk and pressure plate, among others, may be implemented, but they are not shown.

The assembly housing 101 may be a singular monolithic piece of metal or alternatively comprised of a plurality of subcomponents attached or fastened together, such as a first housing component 102 and a second housing component 108 as shown. A gear component 103, which includes a starter ring gear 104 with teeth to be coupled with the pinion of a starter motor (not shown), is disposed between the assembly housing 101 and a stator 106 that is attached to or fixedly coupled with the assembly housing 101, or more specifically the first housing component 102 in the example shown. The starter ring gear component 103 is a separate component from the flywheel 120 and is therefore separately integrated in the electric machine assembly 100, the positions of the gear component 103 and the flywheel 120 being longitudinally offset from each other. The electric machine assembly 100 also includes a rotor 112 that is movably or rotatably coupled with the stator 106 such that the electromagnetic energy applied by the stator 106 causes the rotor 112 to rotate along the longitudinal axis A-A. Between the stator 106 and the rotor 112 is a first dynamic seal 110 which provides a seal to prevent particles such as dust and dirt from entering the portion of the stator 106 which houses the coil windings and the magnets, as further disclosed herein.

On the opposite side of the stator 106 from the gear component 103 is a sealing shield or dust shield 114, disposed between the transmission coupler 120 and the stator 106, which also functions as a seal to prevent dust and dirt from entering the portion of the stator 106 which houses the coil windings and the magnets. The dust shield 114 may be attached to or fixedly coupled with the assembly housing 101, for example the first housing component 102, the second housing component 108, or between these two housing components, and extend toward the rotor 112. Generally, the first housing component 102 contains the starter ring gear component 103 therein, and the second housing component 108 contains the transmission coupler 120 therein.

A second dynamic seal 116 is disposed between the dust shield 114 and the rotor 112 to further facilitate preventing dust and dirt contamination. The seals 110 and 116 are disposed on two opposing sides of the stator 106, with the first dynamic seal 110 disposed between the starter ring gear component 103 and the stator 106 on the first side of the stator 106, and the second dynamic seal 116 disposed between the transmission coupler 120 and the stator 106 on the second, opposite side of the stator 106. They are dynamic in the sense that they accommodate for the relative movement of the rotor 112 with respect to the stator 106 or the dust shield 114. In some examples, the second dynamic seal 116 may be implemented as part of the dust shield 114, whereas in other examples, the second dynamic seal 116 may be positioned between the stator 106 and the rotor 112.

In some examples, the assembly 100 includes a plurality of through bolts 118 which extend at least longitudinally (that is, parallel to the longitudinal axis defined by the broken line A-A in FIG. 1A) between the transmission coupler or flywheel 120 and the gear component 103. The through bolts 118 may extend through at least a portion of a body of the rotor 112 between the flywheel 120 and the gear component 103. In effect, the through bolts 118 fixedly couple together at least the gear component 103, the rotor 112, and the flywheel 120 in order to facilitate rotation of these components in concert with each other.

The assembly housing 101 may further include a coolant housing 122 which receives a coolant line 124 through which a coolant (which may be any suitable coolant including but not limited to a mixture of water and antifreeze) may be introduced to facilitate cooling of the electric machine, or more specifically the stator 106, during its operation. The assembly housing 101 also receives high-voltage cables 126 that electrically couple with the stator 106 to provide or receive electrical current.

FIG. 1B shows thermocouple passthroughs 128, a wiring harness connection 130, as well as first and second terminal boxes 132 and 134 formed on the assembly housing 101, which in this example is the second housing component 108. The terminal boxes 132 and 134 are configured to receive the high-voltage cables 126. The thermocouple passthroughs 128, wiring harness connection 130, and terminal boxes 132 and 134 may be integrally formed from the same material that forms the assembly housing 101. The thermocouple passthroughs 128 facilitate the measuring and monitoring of temperature changes in the electric machine and/or engine, and the wiring harness connection 130 electrically couples with the internal wirings that comprise the stator coils. The high-voltage cables 126 electrically couple the stator 106 with external electrical components, such as stator controller and inverters.

FIG. 2A shows the subcomponents of the first dynamic seal 110, and FIG. 2B shows the subcomponents of the second dynamic seal 116 according to some embodiments disclosed herein. A dynamic seal may include three parts: a first seal housing component 200, a second seal housing component 202, and a sealant 204 disposed between the two seal housing components. The sealant 204 may be made of a compliant or semi-compliant material such as rubber, whereas the housing components 200 and 202 may be made of a more solid material such as plastic. Each of the seal housing components 200 and 202 may be formed in a shape that has a cross-section resembling an L-shape, for example, such that the two housing components form an enclosure in which the sealant 204 may be disposed. In some examples, the seal housing components 200 and 202 may have a U-shaped cross-section, or any other suitable shape which facilitates the enclosure to contain the sealant 204. The sealant 204 may accommodate for the relative movement between the seal housing components 200 and 202 such that a seal is formed even as the first seal housing component 200 moves with respect to the second seal housing component 202.

In the first dynamic seal 110, the first seal housing component 200 is attached to a surface of the rotor 112 such that the position of the first seal housing component 200 is fixed relative to the rotor 112. The second seal housing component 202 is fixedly attached to a portion of the stator 106 that extends toward but does not come into contact with the rotor 112. As the rotor 112 rotates, the position of the first seal housing component 200 dynamically changes as the seal housing component 200 moves along with the rotor 112 as the second seal housing component 202 and the stator 106 remain unmoving. The sealant 204 may move with the first seal housing component 200 or it may remain fixed with the second seal housing component 202. Alternatively, the sealant 204 may move in a speed that is slower than the first seal housing component 200 due to frictional forces. In the second dynamic seal 116, the second seal housing component 202 is fixedly attached to a portion of the dust shield 114. In some examples, the dust shield 114 may be replaced with a portion of the stator 106 which extends toward the rotor 112 from the periphery of the assembly housing 101, as suitable.

Figure 3A:
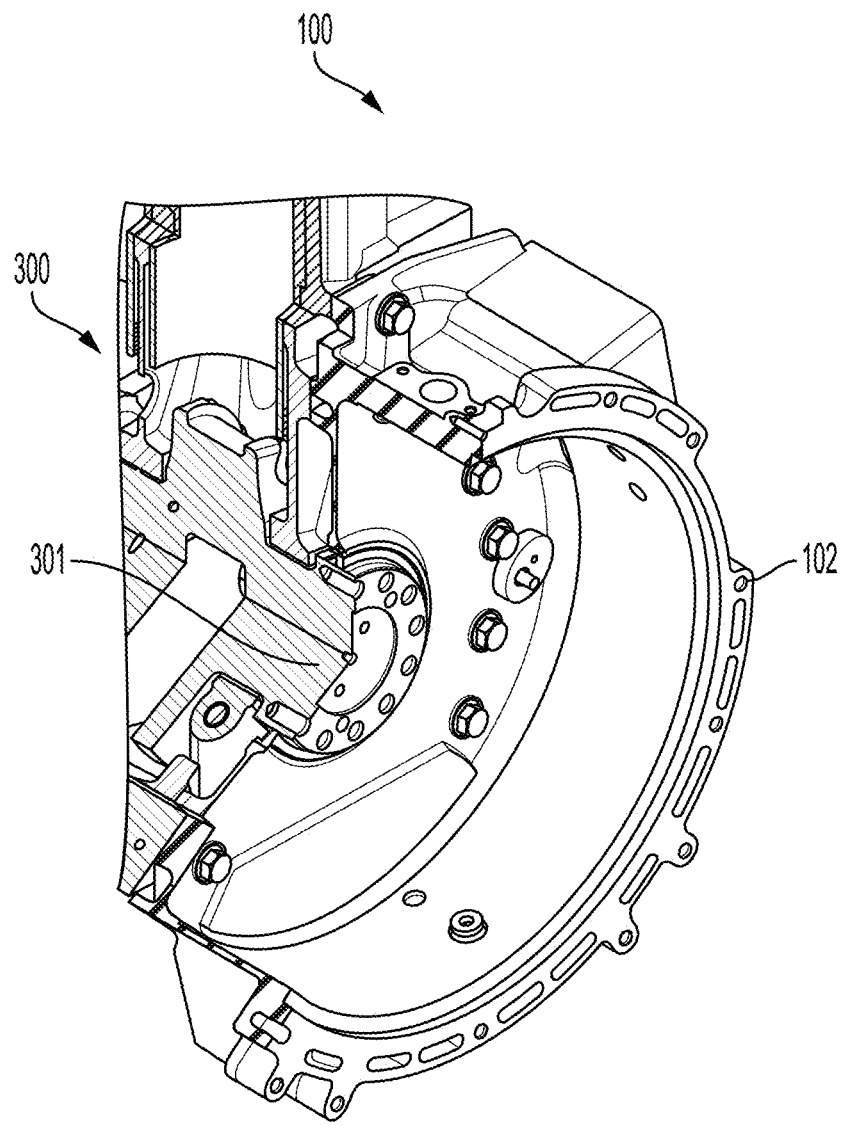
FIG. 3A through FIG. 3G are cutaway diagrams of the electric machine assembly of FIGS. 1A and 1B during different stages of assembly.
Figure 3B:
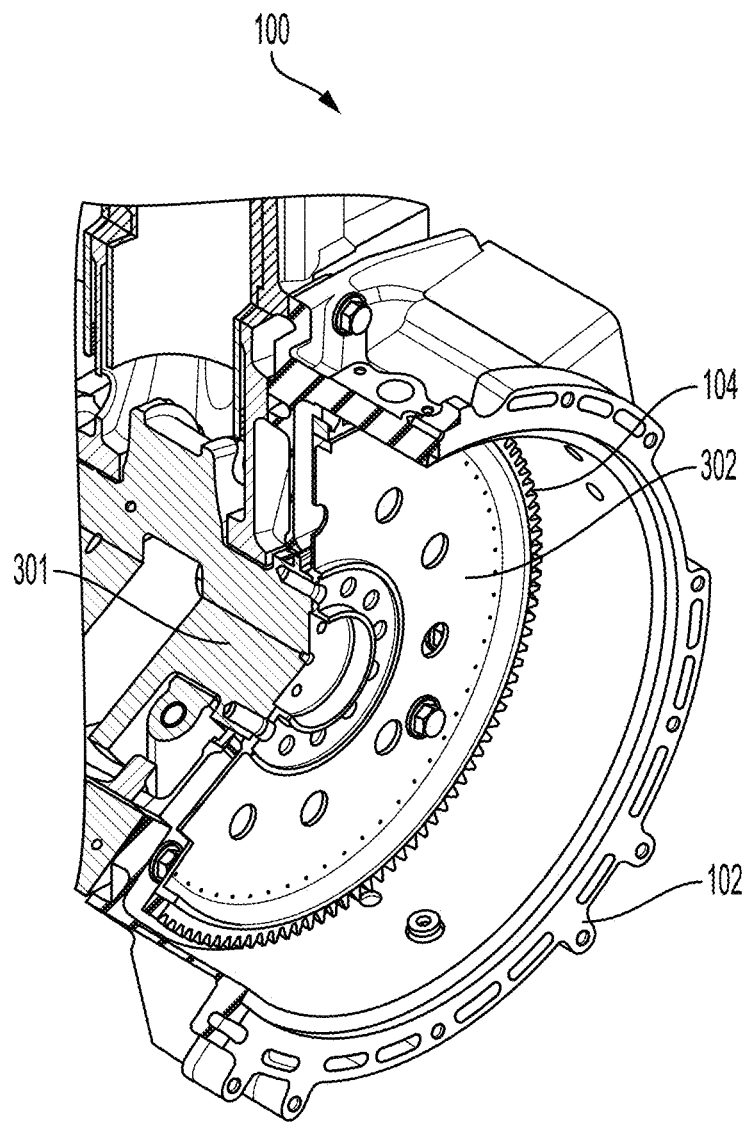

FIGS. 3A through 3G show the electric machine assembly 100 in different stages of assembly, as explained herein. In FIG. 3A, the first housing component 102 may be fixedly coupled with an engine block 300 such that a crankshaft 301 of the engine block 300 extends at least partially into the inner volume defined by the first housing component 102. In FIG. 3B, the starter ring gear component 103, which in this example is the starter ring gear 104 attached to and supported by a starter ring gear carrier 302. The starter ring gear carrier 302 couples with the crankshaft 301 such that the openings formed in the ring gear carrier 302 are aligned with the holes in the crankshaft 301.

Figure 3C:
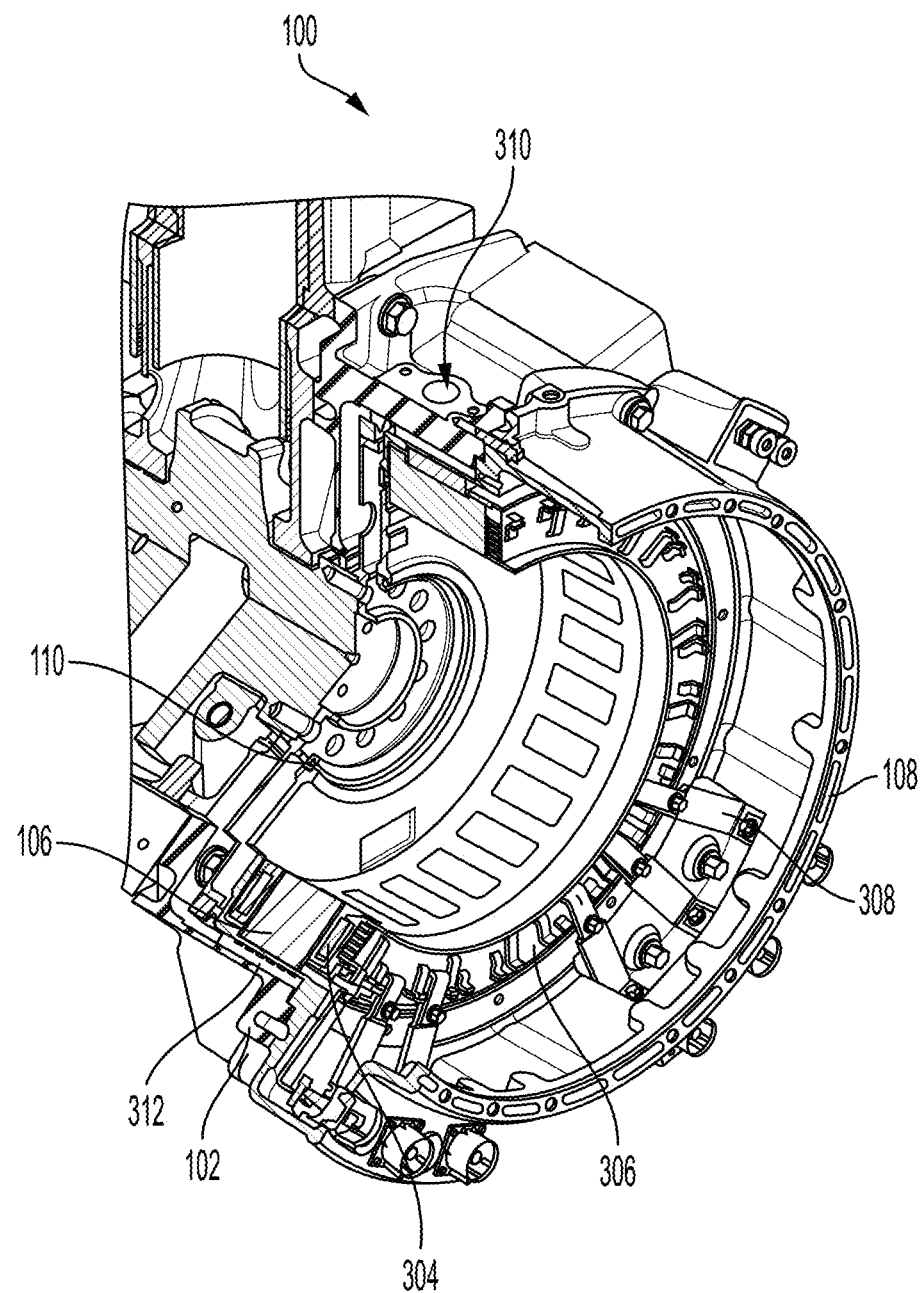

In FIG. 3C, the stator 106 is installed into the assembly housing 101 such that the stator 106 is externally surrounded by the first housing component 102 and the second housing component 108. Coil windings 304 are introduced to be wound around the teeth of the stator 106, and the windings 304 are electrically coupled with a winding connection ring 306 disposed on the stator 106. The ring 306 is electrically coupled with a plurality of busbars 308, each of which connects the ring 306 with the appropriate high-voltage cable 126 to be coupled with an external device such as an inverter.

The first housing component 102 has a stator coolant channel 310 that extends into the housing to deliver coolant therethrough, and the coolant is received by a coolant sleeve 312 which retains the coolant between the sleeve 312 and an outer surface of the stator 106, forming the coolant channel(s). In the example shown, the second housing component 108 is affixed to the first housing component 102 using a plurality of nuts and bolts, although any suitable means of attachment such as welding may also be employed. Also seen in the figure is the first dynamic seal 110, which is formed in a ring-like configuration and fixedly attached to the inner section of the stator 106.

Figure 3D:
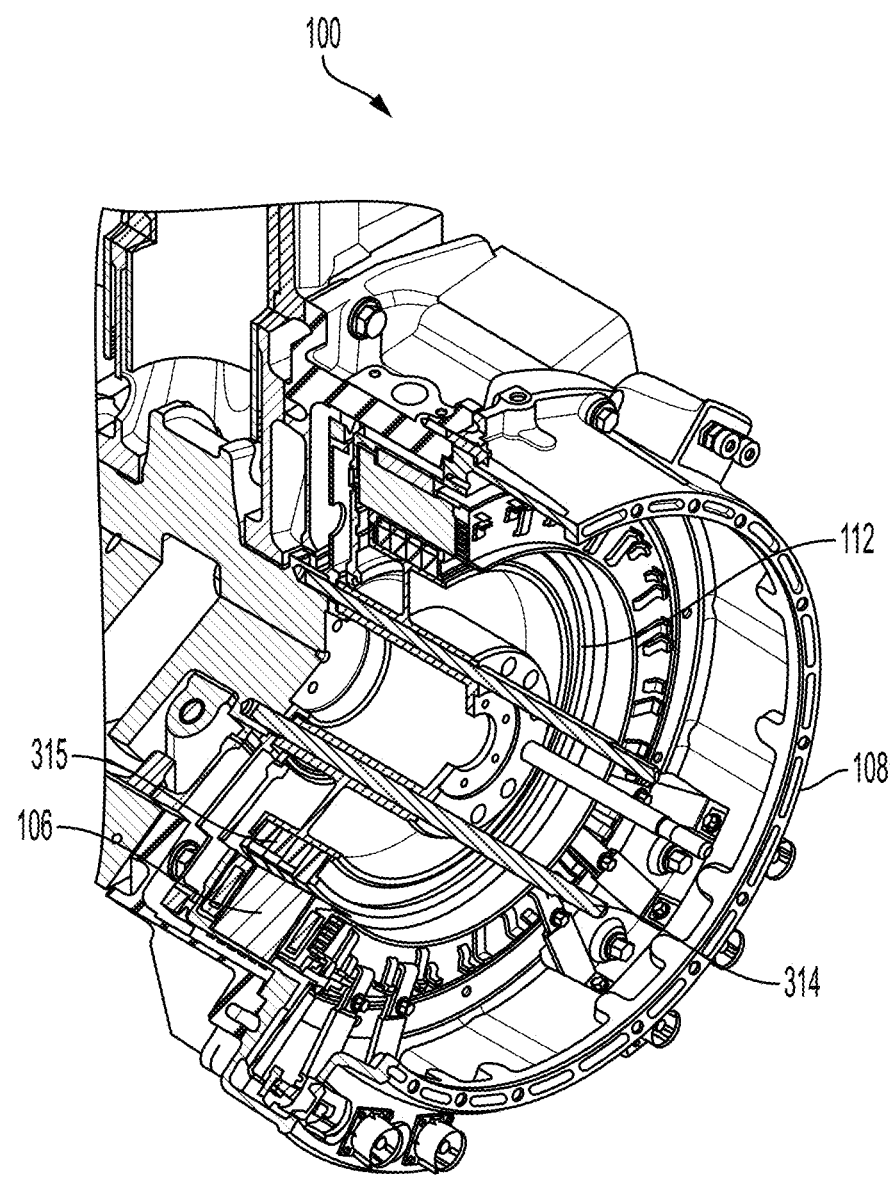
Figure 3E:
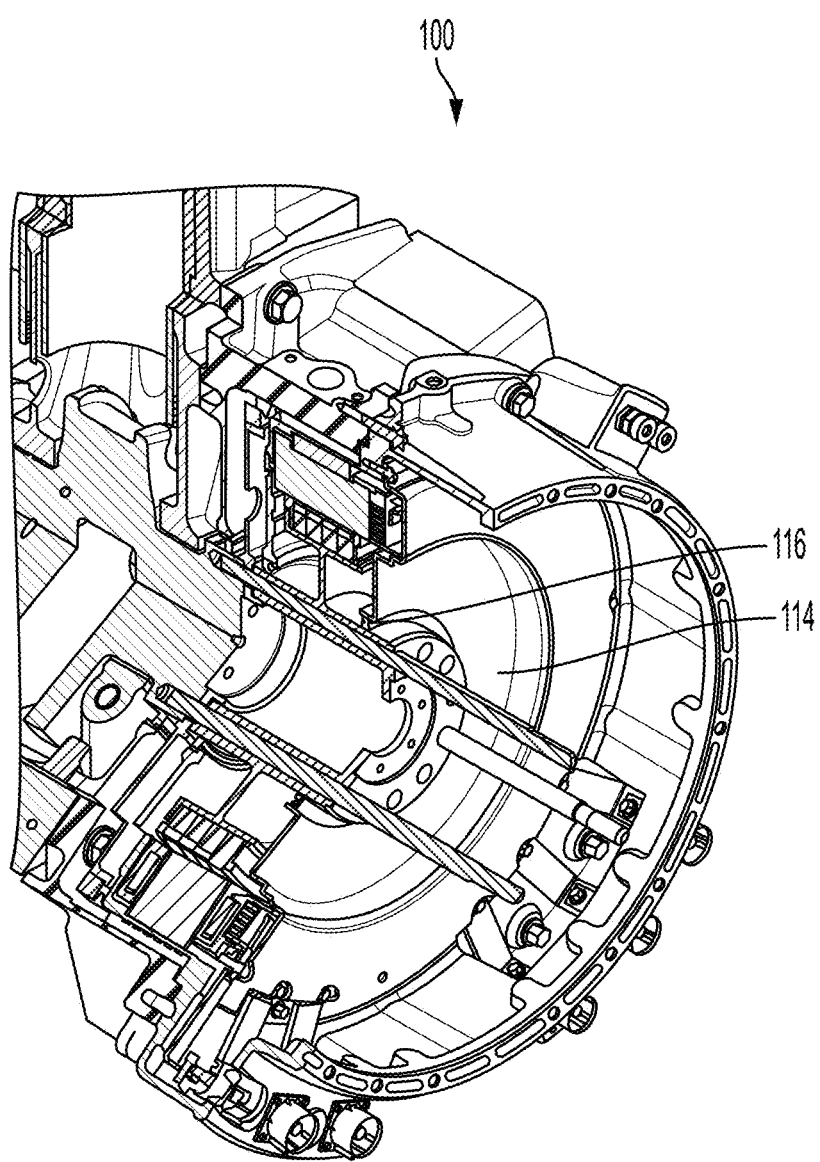

In FIG. 3D, the rotor 112 is introduced into the stator 106, with a plurality of temporary assembly studs 314 inserted through the openings in the rotor 112 in order to align the rotor 112 with the ring gear carrier 302 and the crankshaft 301. The rotor 112 includes magnets 315 facing the stator 106. In FIG. 3E, the dust shield 114 is disposed to cover the stator 106 and an outer portion of the rotor 112 which houses the magnets 315, while an inner portion of the rotor 112 remains exposed. The second dynamic seal 116 is inserted between the innermost portion of the dust shield 114 and a surface of the rotor 112, as previously explained.

Figure 3F:
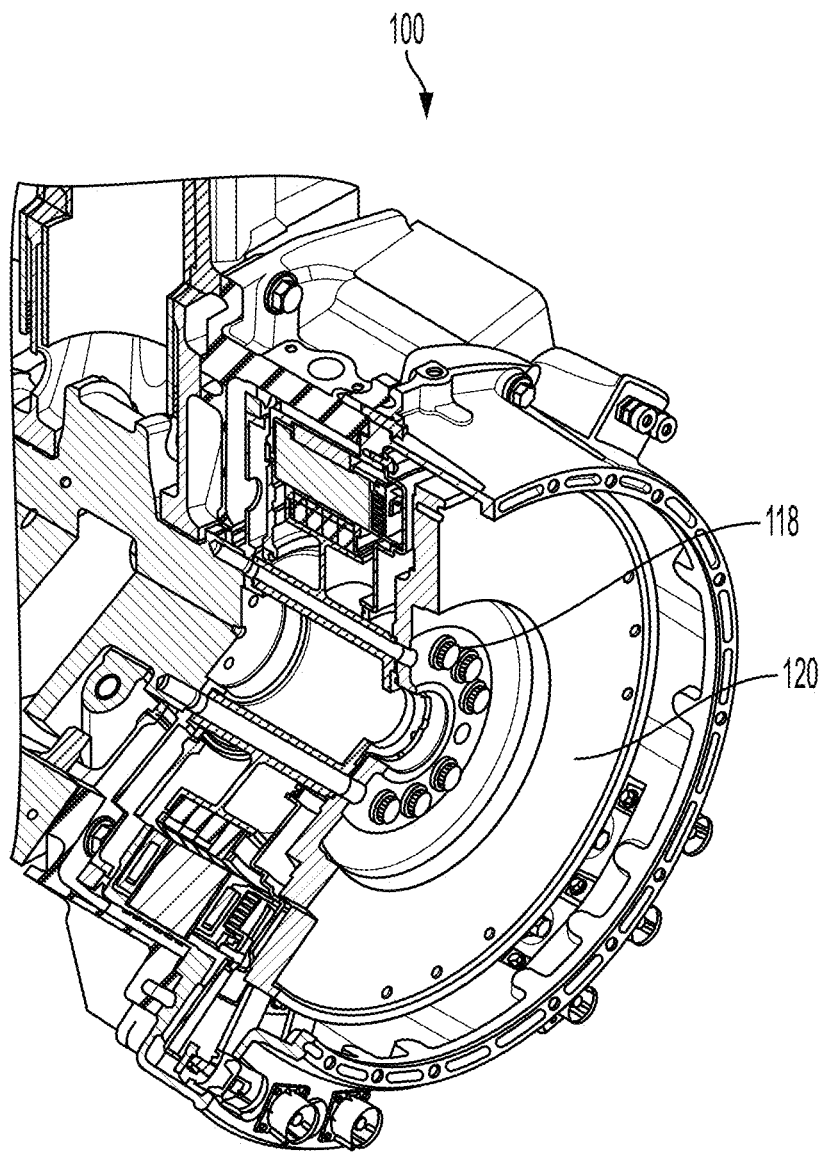
Figure 3G:
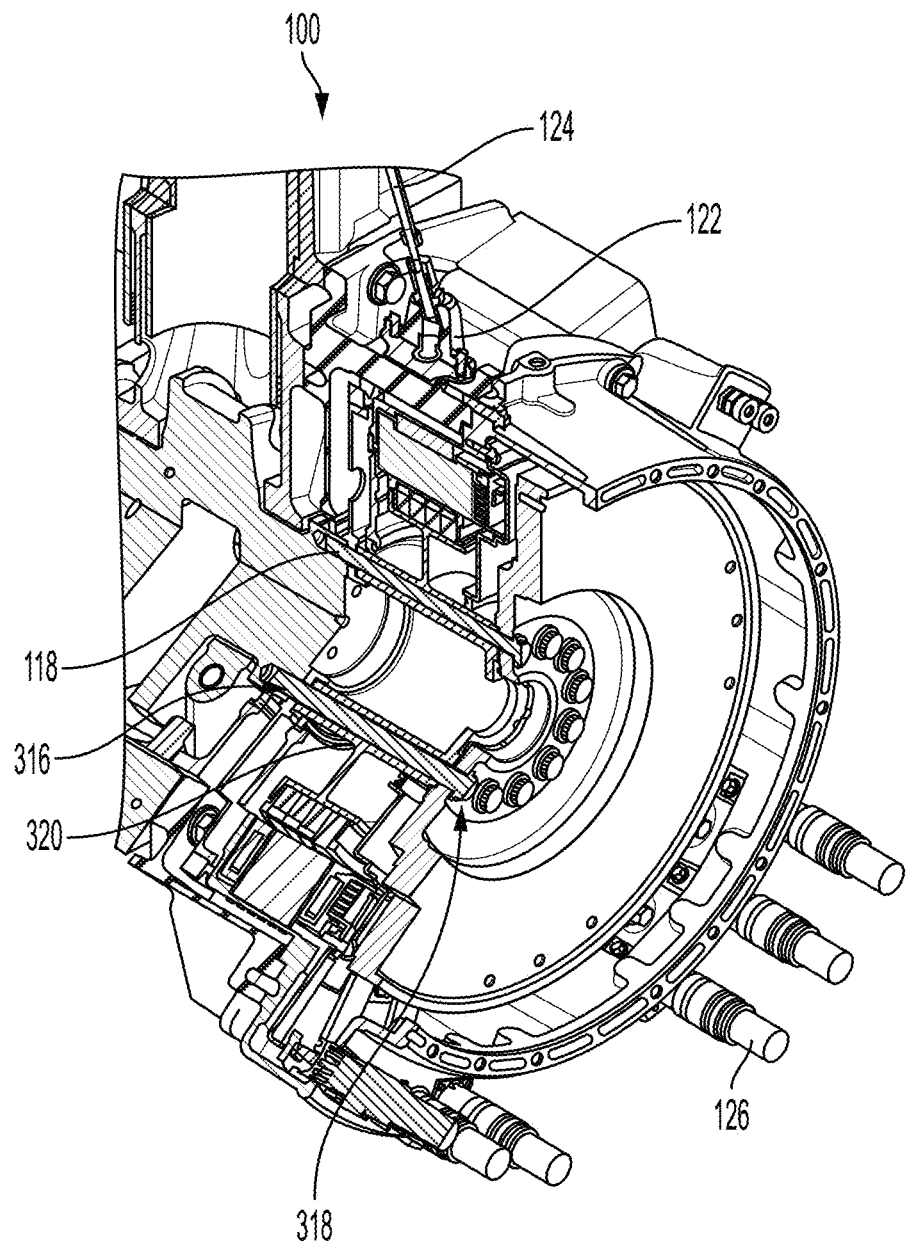

In FIG. 3F, the gearless flywheel 120 is installed proximate the dust shield 114. The flywheel 120 has a plurality of openings that are aligned with the rotor 112 using the temporary assembly studs 314. Once aligned, the assembly studs 314 are removed and replaced with the plurality of through bolts 118 that are inserted into the openings in the flywheel 120, rotor 112, ring gear carrier 302, and crankshaft 301. As such, the through bolts 118 fixedly couple these components to rotate in synchronization with each other. Specifically, as shown in FIG. 3G, each through bolt 118 has a first end 316, a second end 318, and an intermediate portion 320 extending therebetween. The first end 316 is disposed in the crankshaft 301, and the second end is coupled with the flywheel 120. The intermediate portion 320 extends through a body of the rotor 112. After the aforementioned components are fixedly coupled with each other using the through bolts 118, the coolant housing 122 with the coolant line 124 may be attached to the assembly housing 101, as well as the high-voltage cables 126 that are coupled with the busbars 308.

Figure 4A:
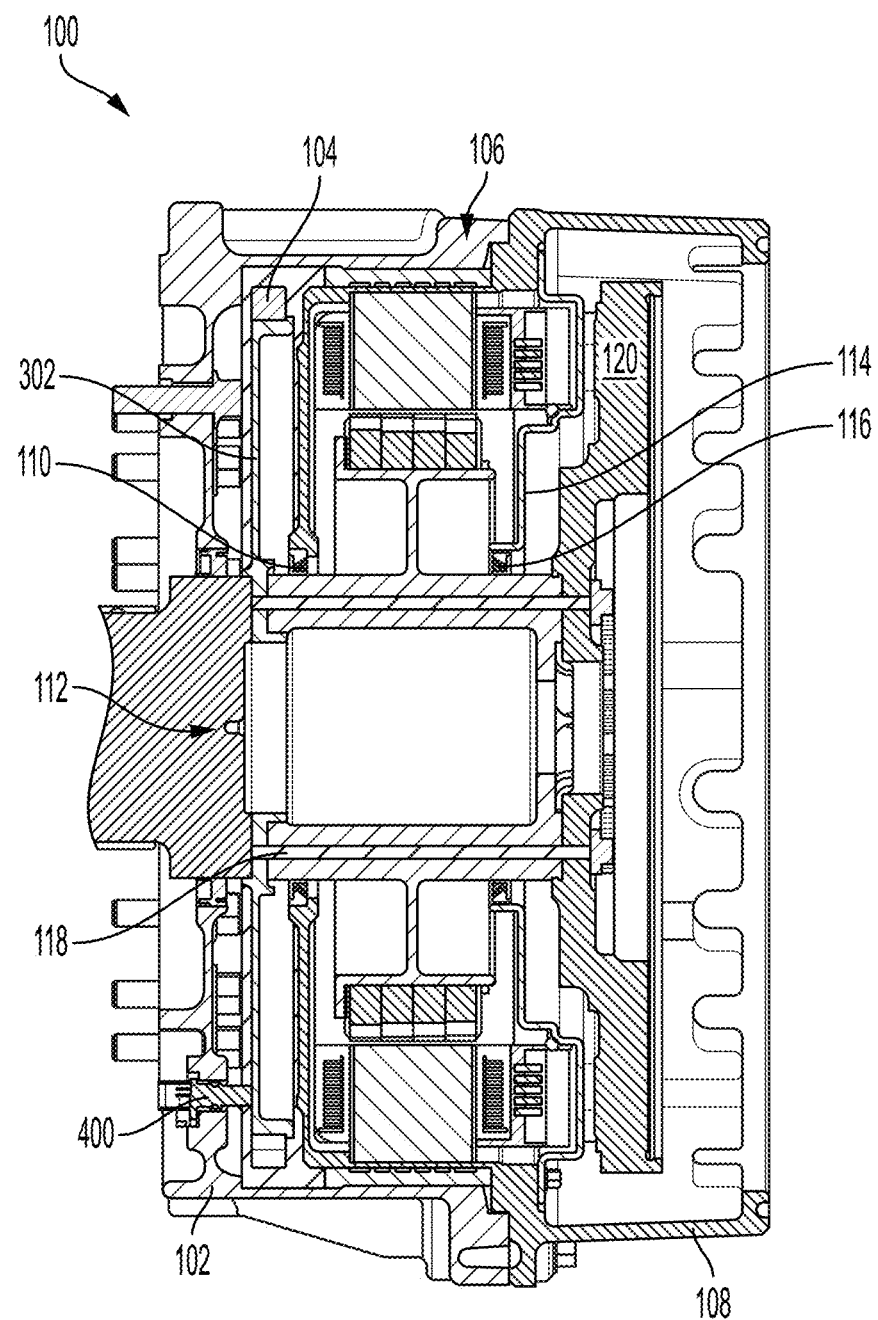
FIG. 4A is a cross-sectional diagram of an electric machine assembly according to embodiments disclosed herein.

FIG. 4A shows the electric machine assembly 100 with a Hall-effect sensor 400 implemented therein, according to some embodiments herein. The Hall-effect sensor 400 is installed in the first housing component 102 and coupled with the ring gear carrier 302. The Hall-effect sensor 400 may operate to sense the position of the rotor 112 relative to the crankshaft 301 at top dead center (TDC) of the engine, for example. The Hall-effect sensor 400 is designed to respond to the surrounding magnetic fields and detects the external magnetic flux density surrounding it in the form of Hall voltage, or the voltage difference across the ring gear component 103.

Figure 4B:
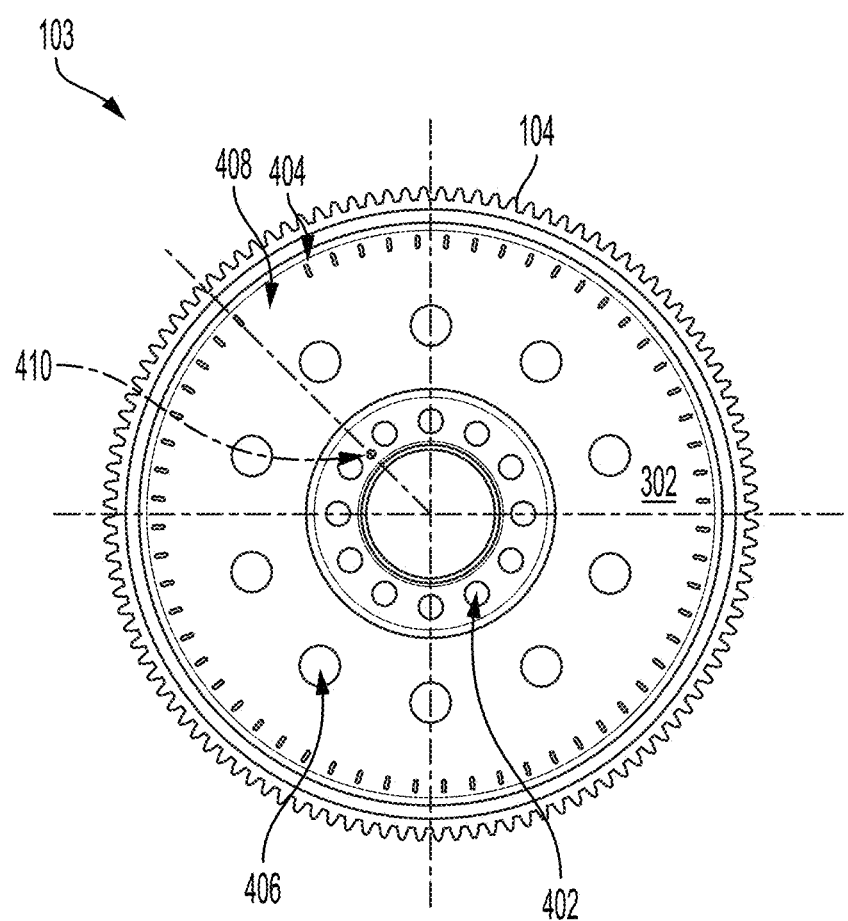
FIG. 4B shows a starter ring gear component according to embodiments disclosed herein.

FIG. 4B shows the ring gear component 103 which may be implemented according to some embodiments disclosed herein. The ring gear component 103 includes the ring gear carrier 302 with a plurality of openings of different sizes and functionalities. The innermost group of openings is called primary openings or through bolt openings 402 because they receive the through bolts 118 to fixedly couple the ring gear component 103 with the other components previously described. The outermost group of openings, located proximate the periphery of the ring gear carrier 302 and closest to the starter ring gear 104, is called secondary openings or Hall-effect detection openings 404 because they facilitate the detection of Hall voltage across the ring gear component 103 by the Hall-effect sensor 400 during operation. In some examples, there is also an intermediate group of openings formed between the openings 402 and 404, called weight reduction openings 406 formed to reduce the amount of material used in the ring gear carrier 302. Reducing the amount of material facilitates reducing the weight of the ring gear component 103 as well as reducing the cost to manufacture the ring gear component 103. Each of the aforementioned openings may be disposed generally equidistally, or at a regular interval, with respect to its neighboring opening within the same group of openings.

In some examples, the ring gear component 103 further includes a portion along the periphery of the ring gear carrier 302 that is devoid of any Hall-effect detection opening 404. The portion may be formed by removing a number of openings 404 that would otherwise be there, and this portion is called a rotation measurement portion 408 which facilitates the Hall-effect sensor 400 to detect the amount of time the ring gear component 103 takes to complete a single full rotation. The amount of time measured can be used to calculate the speed of rotation (rpm) of the ring gear component 103. Furthermore, in some examples, an additional opening called an alignment opening 410 may be disposed proximate the innermost group of openings, i.e. the through bolt openings 402, which functions as an indicator to the location of the rotation measurement portion 408. As shown in the figure, the alignment opening 410 is collinear with one of the Hall-detection openings 404 that is closest to the rotation measurement portion 408 and with the center of the ring gear component 103. Any suitable number of openings may be employed, which may depend upon the size and/or implementation of the ring gear component 103.

Figure 4C:
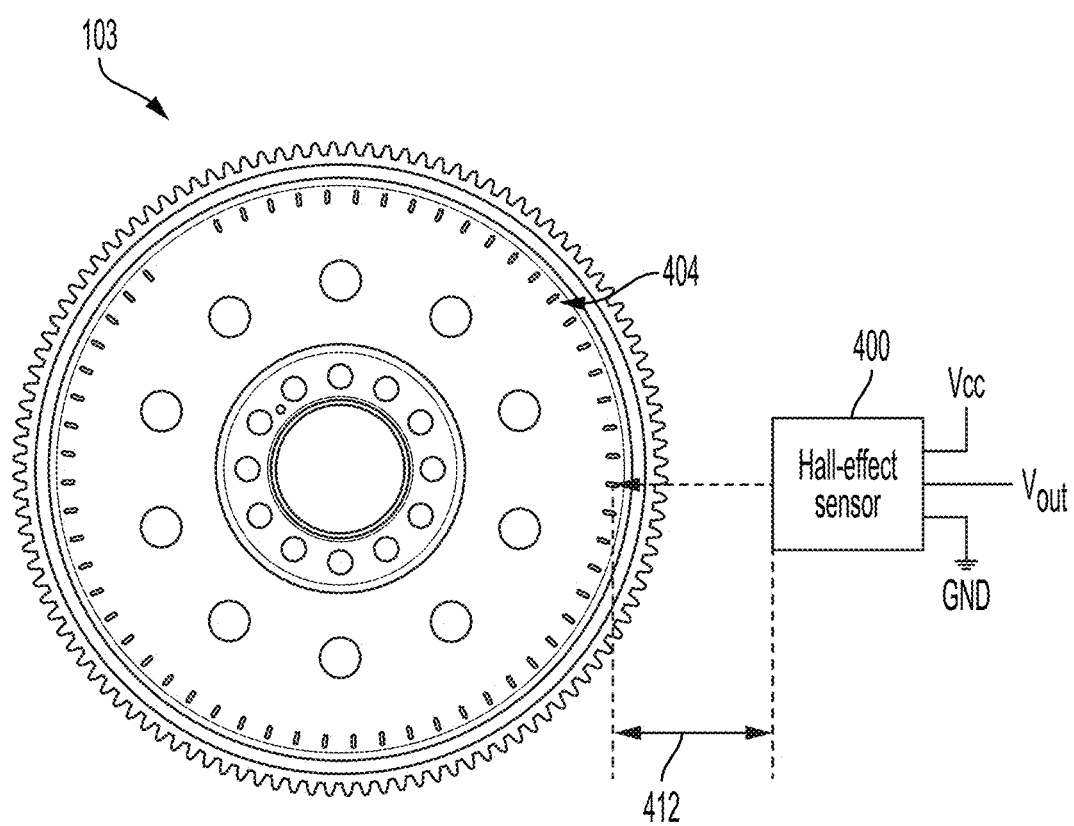
FIG. 4C shows an implementation of the Hall-effect sensor with the ring gear component according to embodiments disclosed herein.

FIG. 4C illustrates an implementation of the Hall-effect sensor 400 with respect to the ring gear component 103. The sensor 400 is connected to a voltage source ($V_{cc}$) and a ground (GND), with an output ($V_{out}$) connected to a monitoring device, such as an oscilloscope. The sensor 400 is positioned proximate the ring gear component 103, with an airgap 412 therebetween, such that the sensor 400 is able to detect or measure the distortion of magnetic field created by a ferrous target, which in this case is the material of the ring gear component 103. As the ring gear component 103 rotates, the plurality of Hall-effect detection openings 400 pass by the Hall-effect sensor 400 such that the Hall-effect sensor 400 detects a different magnetic field when the opening 400 is directly in line with the sensor 400 as compared to when the material of the ring gear component 103 is in line with the sensor 400. The difference in magnetic field causes the output voltage $V_{out}$ to fluctuate, thereby providing a digital output with fluctuating amplitude signal in digital waveform pulses, a.k.a. square pulses. It is to be understood that the Hall-effect sensor 400 may be replaced with an inductive sensor, a.k.a. magnetic pickup sensor, to detect changes in the magnetic field surround an internal coil to produce an oscillating voltage such as a sinusoidal waveform signal instead of the digital waveform pulses provided by the Hall-effect sensor.

Figure 5A:
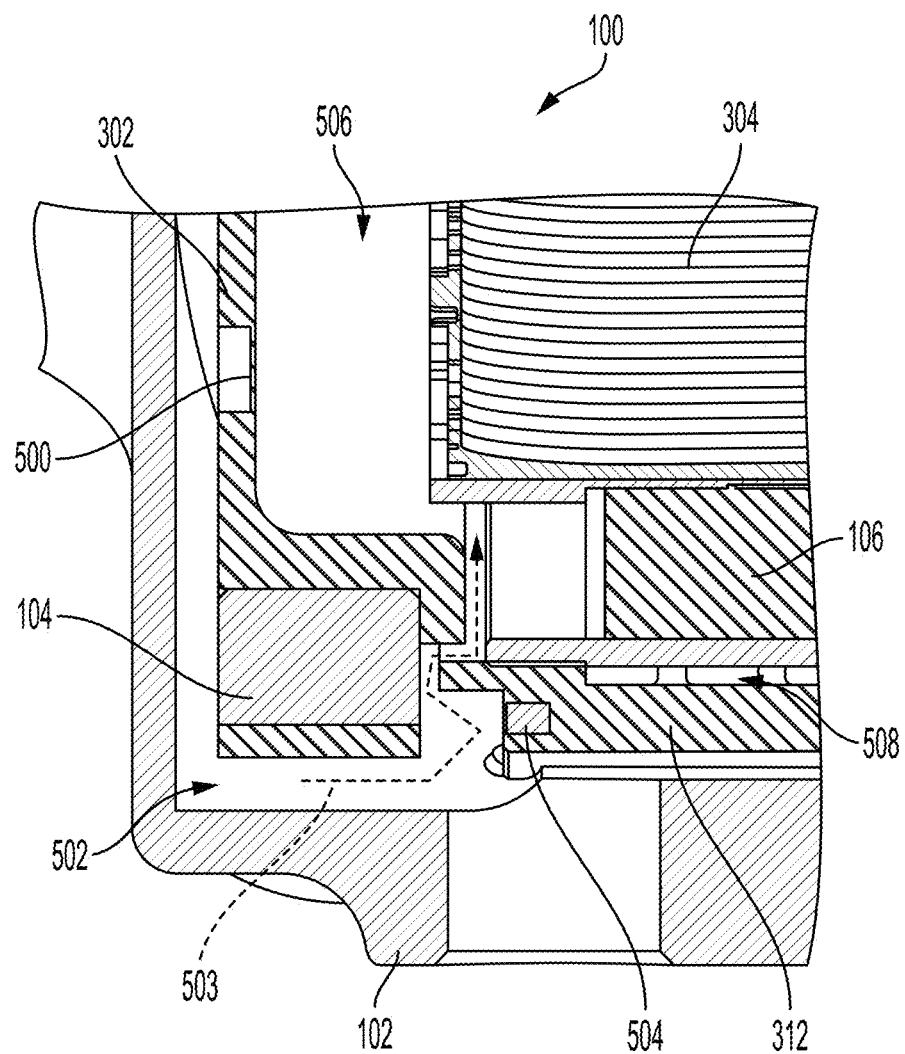
FIG. 5A is a cross-sectional diagram of a portion of an electric machine assembly according to embodiments disclosed herein.

FIG. 5A shows a portion of the ring gear carrier 302 and the first housing component 102 according to some embodiments disclosed herein. The ring gear carrier 302 has depressions 500 proximate its periphery instead of the Hall-effect detection openings 404. That is, the depressions 500 facilitate the measurement of voltage difference across the ring gear carrier 302, but instead of having openings extending through the carrier 302, the depressions 500 extend partially into the carrier 302 while leaving the carrier 302 free of any other openings except for the through bolt openings 402. Therefore, the body of the ring gear carrier 302 forms a barrier that prevents particles such as dust and debris on one side of the carrier 302 from reaching the other side of the carrier 302 without traveling around the outer periphery of the ring gear component 103.

The first housing component 102 and the ring gear carrier 302 which is free of any opening on its body except for the through bolt openings 402 at least partially define a restriction channel 502 in which any dust or debris originating from the engine block 300 is confined. Because the body of the ring gear carrier 302 operates as a barrier, the dust or debris is forced to remain within the restriction channel 502.

A debris path 503 is shown in the figure illustrating the path that is potentially traveled by some of the dust or debris particles, in some examples. The coolant sleeve 312 in some embodiments has a plurality of magnets 504 attached thereto or embedded therein (for example, epoxied therein) which attract any ferrous particles that may be trapped inside the restriction channel 502. The magnets 504 may be any suitable material, for example neodymium or other rare-earth magnets. Ferrous dust or debris particles resulting from components wearing out from frictional forces after extended use may be trapped inside the restriction channel 502 during operation, and the magnets 504 operate to magnetically attract such particles toward the edge of the coolant sleeve 312 to facilitate preventing such particles from entering an internal volume 506 of the stator 106 that is defined at least partially by the ring gear carrier 302 and the stator 106.

As shown by the debris path 503, some of the particles may escape from the restriction channel 502 and into the internal volume 506. However, the amount of particles that enter the internal volume 506 is significantly reduced because the majority of the particles would be retained either inside the restriction channel 502 or proximate the magnets 504 located at the end of the coolant sleeve 312. Furthermore, if the first dynamic seal 110 is implemented, the seal 110 would further facilitate preventing the remaining particles in the internal volume 506 from entering the section of the stator 106 which houses the coil windings 304.

FIGS. 5B and 5C show an example of the coolant sleeve 312 with a plurality of counterbores 510 according to some embodiments. The counterbores 510 are configured to receive the magnets 504 such that the magnets 504 can be dispersed throughout the coolant sleeve 312 in generally equal intervals, although in some other examples the magnets 504 may be more concentrated in one area than another. The counterbores 510 may be any suitable depressions that may house a portion of the magnet 504 or the entire length of the magnet 504 (as shown in FIG. 5A, for example).

FIG. 5D shows a cross-sectional view of the ring gear component 103 at one of the depressions 500 formed therein. The depression 500 may be formed by partially cutting out the material of the ring gear component 103 such that the thickness (T) of the ring gear component 103 at the depression 500 is less than the rest of the component 103. In some examples, the depressions 500 are preformed when the ring gear component 103 is made. The depth (D) of the depression may be at least 50%, at least 70%, at least 80%, or at least 90% of the maximum thickness (T) of the ring gear component 103, for example, so long as the depth does not create an opening or a through-hole that extends from one surface of the ring gear component 103 to the other surface thereof. In some examples, the depth (D) may be adjusted depending on how sensitive the Hall-effect sensor 400 (or alternatively, the inductive sensor) is to the changes in magnetic field as the depressions 500 pass by the sensor. It should be noted that, greater the depth (D) of the depressions, the greater the change would be in the magnetic field as caused by the depressions. The shape of the depressions may be circular, ovular, polygonal, etc. that facilitates causing the changes in magnetic field within the sensor.

FIG. 6 shows an assembly view of an electric machine assembly 600 according to some embodiments. In the example shown, the transmission coupler is not a flywheel but a flex plate 602, where the flex plate has a first side 602A that is fixedly coupled with the rotor 112 and a second side 602B opposite from the first side 602A that is fixedly coupled with an automatic transmission integration 604. The rotor 112, flex plate 602, and the automatic transmission integration 604 are generally aligned along a longitudinal axis defined by the broken line B-B, and all the broken lines shown in the figure are aligned generally parallel to this line.

The automatic transmission integration 604 includes a flex plate adapter 610, a torque converter 612, and a transmission 614, in some examples. The through bolts 118 are inserted through the through bolt openings 402 of the flex plate 602, and the through bolts 118 extend through a portion of the rotor 112 and the ring gear carrier 302 to fixedly couple them with the flex plate 602. The flex plate 602 also has a plurality of bolt openings 607 which facilitate coupling of the flex plate adapter 610 with the flex plate 602 by inserting a plurality of bolts 608 through the openings 607 and fixing them to a plurality of nuts 606 on the other side.

Specifically, the nuts 606 are attached to the first side 602A of the flex plate 602, for example using adhesives, welding, or any other suitable attaching means. The second side 602B opposite from the first side 602A at least partially defines the surface to which the flex plate adapter 610 is configured to be fixedly coupled. When the flex plate adapter 610 is positioned against the second side 602B, the bolts 608 are screwed into the nuts 606 to fixedly couple the flex plate adapter 610 with the flex plate 602.

The advantages of this implementation result from the nuts 606 being attached (or pre-attached) to the side of the flex plate 602 (that is, the first side 602A) which faces the rotor 112. If the positions of the nuts 606 and the bolts 608 were reversed, the assembling of the electric machine would face difficulties in screwing the bolts 608 located on the opposite side of the flex plate from the flex plate adapter 610. However, if the nuts 606 are instead already attached to the flex plate 602 on the opposite side during the assembling, only the bolts 608 are required to be moved in order to tighten the mechanical coupling between the nuts 606 and the bolts 608. In some examples, the bolts 608 may be tightened using a tool such as a wrench that is inserted through a service window 616 of the transmission 614.

Figure 7:
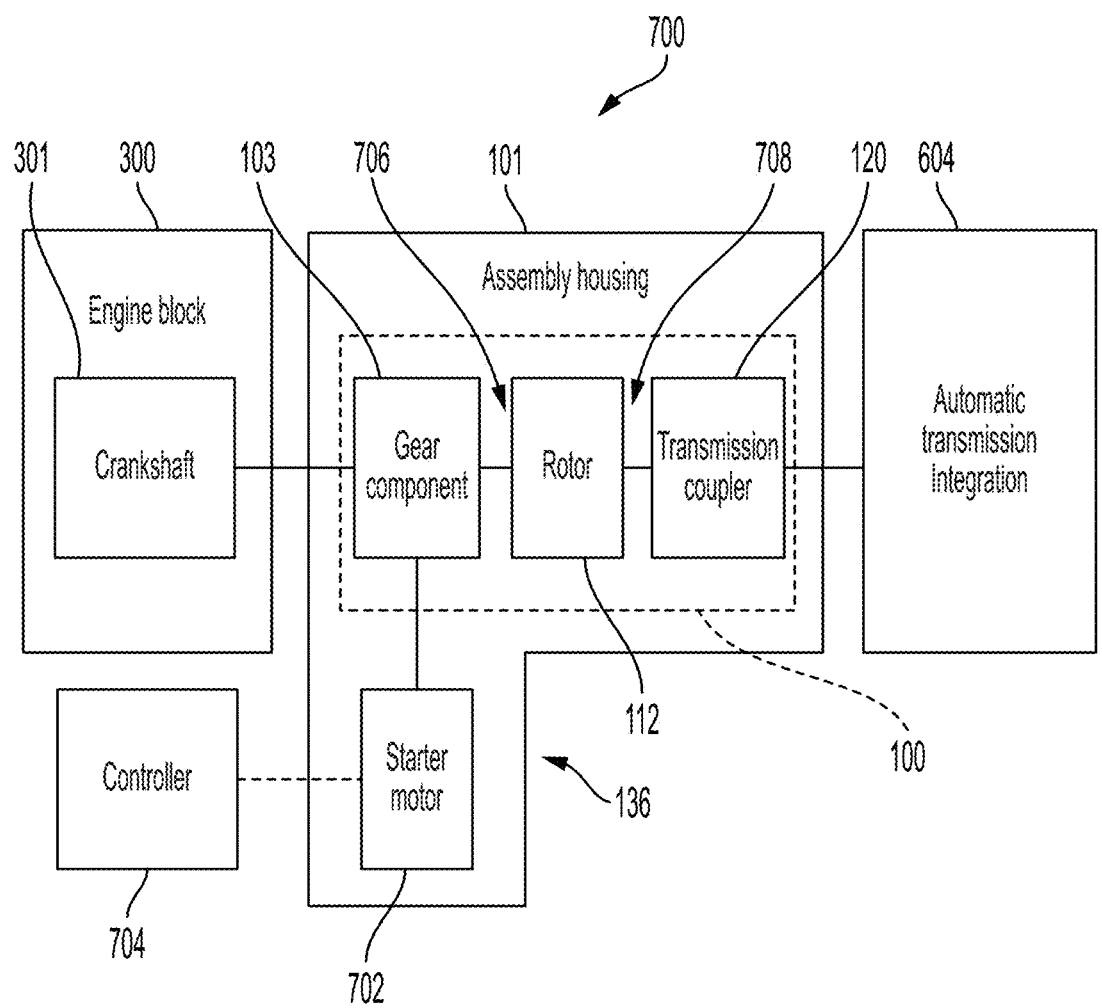
FIG. 7 is a schematic diagram of an engine system according to embodiments disclosed herein.

FIG. 7 shows an engine system 700 according to some embodiments. The engine system 700 includes, in addition to the components previously explained, a starter motor 702 that is mechanically and operatively coupled with the starter ring gear component 103 (or, more specifically, the starter ring gear 104) as well as a controller 704 that controls the operation of the starter motor 702. The controller 704 is electrically coupled with the starter motor 702. In the figure, mechanical couplings (whether they are fixed or movable mechanical couplings) are indicated in thick lines whereas the electrical coupling is indicated in a thin broken line. The starter motor 702 is enclosed or received in a starter enclosure portion 136 of the assembly housing 101. The assembly housing 101 further includes the gear component 103, the rotor 112, and the transmission coupler 120 (or 602) such that the gear component 103 is located on a first side 706 of the rotor 112 and the transmission coupler 120 is located on a second side 708 of the rotor 112 that is opposite from the first side 706.

One of the advantages in implementing the features as disclosed herein includes more flexible design of the electric machine by separating the starter ring gear from the transmission coupler such as flywheel. When the starter ring gear is positioned on the outer periphery of the flywheel as known in the art, the pinion of the starter motor must be positioned next to the flywheel, thereby limiting the locations where the starter motor may be disposed. However, when the starter ring gear is separated from the flywheel, the position of the pinion may be adjusted according to where the starter ring gear is located, thereby facilitating positioning of the starter motor away from the flywheel.

In some cases, longitudinally offsetting the starter ring gear from the flywheel can maintain the position of the starter motor with respect to the engine block while the flywheel may be positioned at any suitable distance from the starter motor. Positioning the flywheel distally from the starter motor is advantageous in allowing stators of different sizes to be implemented in the electric machine. That is, because the stator is located at a longitudinally offset position from the starter motor (between the flywheel and the starter motor, for example) the presence of the starter motor would not place a limitation on the size of the stator, so stators with greater outer diameters may be implemented in the electric machine than would otherwise be possible if the starter ring gear was implemented on the outer periphery of the flywheel.

Another advantage in implementing the features as disclosed herein includes the improved dust and debris control within the electric machine. With the dynamic seal component being implemented between the stator and the rotor, the amount of dust and debris entering the electrical parts of the stator that are sensitive to such particles, for example the coil windings, connection rings, busbars, etc., may be significantly reduced from not only the engine/crankshaft side but also the transmission side. Additional improvement in dust and debris control may result from the implementation of the restriction channel formed between an outer portion of the assembly housing and the starter ring gear component, where the dust and debris particles are directed toward a magnet disposed in the restriction channel to collect and retain ferrous particles.

Furthermore, the through bolts as implemented in the embodiments facilitate improved coupling between the flywheel, the rotor, and the crankshaft, causing these components to move in concert with one another and preventing any of these components from being decoupled from the rest. In the implementations where the flywheel is replaced with a flex plate, the nuts that are attached to one side of the flex plate allows assembly of the components in tight spaces without compromising the overall design of the electric machine assembly. Further advantages would be appreciated by those of ordinary skill in the art based on the disclosed embodiments and examples.

Although the examples and embodiments have been described in detail with reference to certain preferred embodiments, variations and modifications exist within the spirit and scope of the disclosure as described and defined in the following claims.

What is claimed is:

1. An electric machine assembly comprising:
   a stator;
   a rotor movably coupled with the stator;
   a starter ring gear component fixedly coupled with the rotor on a first side of the stator;
   a transmission coupler fixedly coupled with the rotor on a second side of the stator opposite from the first side;
   a first dynamic seal disposed between the starter ring gear component and the stator on the first side of the stator; and
   a second dynamic seal disposed between the transmission coupler and the stator on the second side of the stator, wherein each of the first dynamic seal and the second dynamic seal comprises:
      a first seal housing component attached to the rotor;
      a second seal housing component movably coupled with the first seal housing component; and
      a sealant disposed between the first seal housing component and the second seal housing component.

2. The electric machine assembly of claim 1, further comprising:
   a sealing shield disposed between the transmission coupler and the stator, wherein the second dynamic seal is attached to the sealing shield.

3. The electric machine assembly of claim 2, wherein the second seal housing component is attached to the sealing shield.

4. The electric machine assembly of claim 2, further comprising:
   an assembly housing having a first housing component and a second housing component, the first housing component containing the starter ring gear component therein and the second housing component containing the transmission coupler therein,
   wherein the second housing component is fixedly attached to the sealing shield.

5. The electric machine assembly of claim 4, wherein the first housing component includes a starter enclosure portion configured to receive therein a starter motor to be operatively coupled with the starter ring gear component.

6. An electric machine assembly comprising:
   a stator;
   a rotor movably coupled with the stator;
   a starter ring gear component fixedly coupled with the rotor on a first side of the stator;
   a transmission coupler fixedly coupled with the rotor on a second side of the stator opposite from the first side; and
   a plurality of through bolts configured to couple the transmission coupler with the starter ring gear component,
   wherein each through bolt comprises:
      a first end fixedly coupled with the transmission coupler,
      a second end fixedly coupled with the starter ring gear component, and
      an intermediate portion therebetween extending through at least a portion of the rotor.

7. The electric machine assembly of claim 1, wherein the starter ring gear component comprises a starter ring gear carrier and a starter ring gear disposed on a periphery thereof, the starter ring gear carrier having a plurality of openings configured to receive a plurality of through bolts.

8. The electric machine assembly of claim 7, further comprising a Hall-effect sensor operatively coupled with the starter ring gear carrier, wherein the starter ring gear carrier further comprises:
   a plurality of secondary openings to facilitate measuring of a voltage difference across the starter ring gear component by the Hall-effect sensor, or
   a plurality of depressions to facilitate measuring of the voltage difference across the starter ring gear component by the Hall-effect sensor.

9. An electric machine assembly comprising:
   a stator;
   a rotor movably coupled with the stator;
   a starter ring gear component fixedly coupled with the rotor on a first side of the stator;
   a transmission coupler fixedly coupled with the rotor on a second side of the stator opposite from the first side;
   an assembly housing containing the starter ring gear component therein; and
   a restriction channel at least partially defined by the starter ring gear component and the assembly housing, the restriction channel configured to retain debris therewithin.

10. The electric machine assembly of claim 9, further comprising:
    a coolant sleeve attached to the stator, the coolant sleeve comprising a plurality of magnets configured to magnetically attract and retain ferrous debris within the restriction channel.

11. An electric machine assembly comprising:
    a stator;
    a rotor movably coupled with the stator;
    a starter ring gear component fixedly coupled with the rotor on a first side of the stator; and
    a transmission coupler fixedly coupled with the rotor on a second side of the stator opposite from the first side, wherein the transmission coupler is one of: a gearless flywheel or a flex plate.

12. The electric machine assembly of claim 11, further comprising:
    a plurality of through bolts configured to couple the flex plate with the starter ring gear component,
    wherein each through bolt comprises:
       a first end fixedly coupled with the flex plate,
       a second end fixedly coupled with the starter ring gear component, and
       an intermediate portion therebetween extending through at least a portion of the rotor;
    the flex plate comprising a plurality of nuts attached to a first side of the flex plate, wherein the first side of the flex plate is configured to be fixedly coupled with the rotor and a second side of the flex plate opposite from the first side is configured to receive the plurality of through bolts to fixedly couple the flex plate with the rotor.

13. The electric machine assembly of claim 12, further comprising:
    an automatic transmission integration configured to be fixedly coupled with the flex plate on the second side of the flex plate, the automatic transmission integration comprising a flex plate adapter configured to be fixedly coupled with the second side of the flex plate via a plurality of bolts fixedly coupled with the plurality of nuts.

14. The electric machine assembly of claim 13, the automatic transmission integration further comprising:
a transmission having a service window therein, the service window configured to receive any tool to facilitate coupling the plurality of bolts to the plurality of nuts.

15. An engine system comprising:
an engine block comprising a crankshaft;
a starter motor; and
an electric machine assembly operatively coupled with the engine block, the electric machine assembly comprising:
a stator;
a rotor fixedly coupled with the crankshaft and movably coupled with the stator;
a starter ring gear component fixedly coupled with the crankshaft and the rotor on a first side of the stator, wherein the starter motor is operatively coupled with the starter ring gear component;
a transmission coupler fixedly coupled with the rotor on a second side of the stator opposite from the first side; and
an assembly housing having a starter enclosure portion configured to receive therein the starter motor.

16. The engine system of claim 15, the electric machine assembly further comprising:
a plurality of through bolts configured to couple the transmission coupler with the starter ring gear component,
wherein each through bolt comprises:
a first end fixedly coupled with the transmission coupler,
a second end fixedly coupled with the crankshaft, and
an intermediate portion therebetween extending through at least a portion of the rotor.

17. A method of assembling an engine system, the method comprising:
attaching an electric machine assembly housing to an engine block;
fixedly coupling a starter ring gear component with a crankshaft of the engine block;
fixedly coupling a stator within the assembly housing;
fixedly coupling a rotor with the starter ring gear component on a first side of the rotor and rotatably coupling the rotor with the stator;
fixedly coupling a transmission coupler with the rotor on a second side of the rotor, the second side being opposite from the first side;
disposing a first dynamic seal between the starter ring gear component and the stator on the first side of the stator; and
disposing a second dynamic seal between the transmission coupler and the stator on the second side of the stator,
wherein each of the first dynamic seal and the second dynamic seal comprises:
a first seal housing component attached to the rotor;
a second seal housing component movably coupled with the first seal housing component; and
a sealant disposed between the first seal housing component and the second seal housing component.

* * * * *